United States Patent
Wang (10) Patent No.: US 9,113,227 B2
(45) Date of Patent: Aug. 18, 2015

(54) REDUCED COMPLEXITY TRANSCODING

(75) Inventor: Zhongfeng Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 356 days.

(21) Appl. No.: 13/564,397

(22) Filed: Aug. 1, 2012

(65) Prior Publication Data

US 2013/0235886 A1 Sep. 12, 2013

Related U.S. Application Data

(60) Provisional application No. 61/609,900, filed on Mar. 12, 2012.

(51) Int. Cl.
*H04N 19/40* (2014.01)
*H04N 21/647* (2011.01)
*H04N 19/70* (2014.01)
*H04L 27/26* (2006.01)
*H04L 29/06* (2006.01)

(52) U.S. Cl.
CPC ......... *H04N 21/64784* (2013.01); *H04N 19/40* (2014.01); *H04N 19/70* (2014.01); *H04L 27/2613* (2013.01); *H04L 69/22* (2013.01)

(58) Field of Classification Search
CPC .................... H04N 19/00472; H04N 19/40
USPC ................ 370/392, 395.1, 464, 474, 476
See application file for complete search history.

(56) References Cited

U.S. PATENT DOCUMENTS

| | | | | |
|---|---|---|---|---|
| 5,687,095 A * | 11/1997 | Haskell et al. | ............. | 348/386.1 |
| 6,748,020 B1 * | 6/2004 | Eifrig et al. | ............. | 375/240.26 |
| 7,274,315 B2 * | 9/2007 | Baumer | .......................... | 341/95 |
| 7,292,632 B2 * | 11/2007 | Etoh et al. | ................ | 375/240.01 |
| 7,639,687 B1 * | 12/2009 | Tsai et al. | ...................... | 370/392 |
| 8,255,779 B2 * | 8/2012 | Booth | .......................... | 714/789 |
| 8,514,897 B2 * | 8/2013 | Jiang | .............................. | 370/537 |
| 8,831,040 B2 * | 9/2014 | Nakajima et al. | ............. | 370/474 |
| 8,837,605 B2 * | 9/2014 | Heng et al. | ................ | 375/240.29 |
| 2005/0047433 A1 * | 3/2005 | Rizer et al. | ..................... | 370/464 |
| 2007/0103344 A1 * | 5/2007 | Baumer | .......................... | 341/50 |
| 2009/0190595 A1 * | 7/2009 | Jiang et al. | ................. | 370/395.1 |
| 2009/0274172 A1 * | 11/2009 | Shen et al. | ..................... | 370/472 |
| 2011/0126074 A1 * | 5/2011 | Calderon et al. | ............. | 714/752 |
| 2011/0138250 A1 * | 6/2011 | Ganga et al. | .................. | 714/758 |
| 2011/0173516 A1 * | 7/2011 | Geng et al. | ..................... | 714/775 |

OTHER PUBLICATIONS

Zhongfeng Wang, et al., Further Studies of FEC Codes for 100G-KR, IEEE 802.3bj Meeting, Atlanta, GA, Nov. 2011.
Nokia Siemens Networks, Optical Transport Network Switching: Creating efficient and cost-effective optical transport networks, White Paper, Copyright 2011, dated Jul. 26, 2011 on www.NOKIASIEMENSNETWORKS.com.
Mitsuhiro Teshima, et al., Bit-Error-Tolerant (512*N+1)B Code for 40Gb/s and 100Gb/s Ethernet Transport, NTT Network Innovation Laboratories, NTT Corporation, Yokosuka, Japan, Infocom Workshops 2008, IEEE, Apr. 13-18, 2008.

* cited by examiner

*Primary Examiner* — Andrew Lai
*Assistant Examiner* — Andrew C Lee
(74) *Attorney, Agent, or Firm* — Brinks Gilson & Lione (57) ABSTRACT

Efficient transcoding and decoding techniques are widely applicable across multiple different transcoding formats. The techniques find many applications in, as one example, high speed networking. The techniques provide reduced computational and implementation complexity. The techniques may also improve the processing latency compared with other transcoding techniques.

20 Claims, 11 Drawing Sheets

Prior Art

REDUCED COMPLEXITY TRANSCODING

CROSS REFERENCE TO RELATED APPLICATIONS

This application claims the priority benefit of provisional application Ser. No. 61/609,900 filed Mar. 12, 2012, which is incorporated herein by this reference in its entirety.

TECHNICAL FIELD

This disclosure relates to transcoding.

BACKGROUND

High speed networking systems built by telecommunication service providers employ, for several different reasons, transcoding techniques for data streams that cross the network. Today, telecommunication service providers are called upon to accommodate ever increasing bandwidth at ever decreasing prices. Accordingly, improvements in the computational and implementation complexity of transcoding techniques are of interest.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
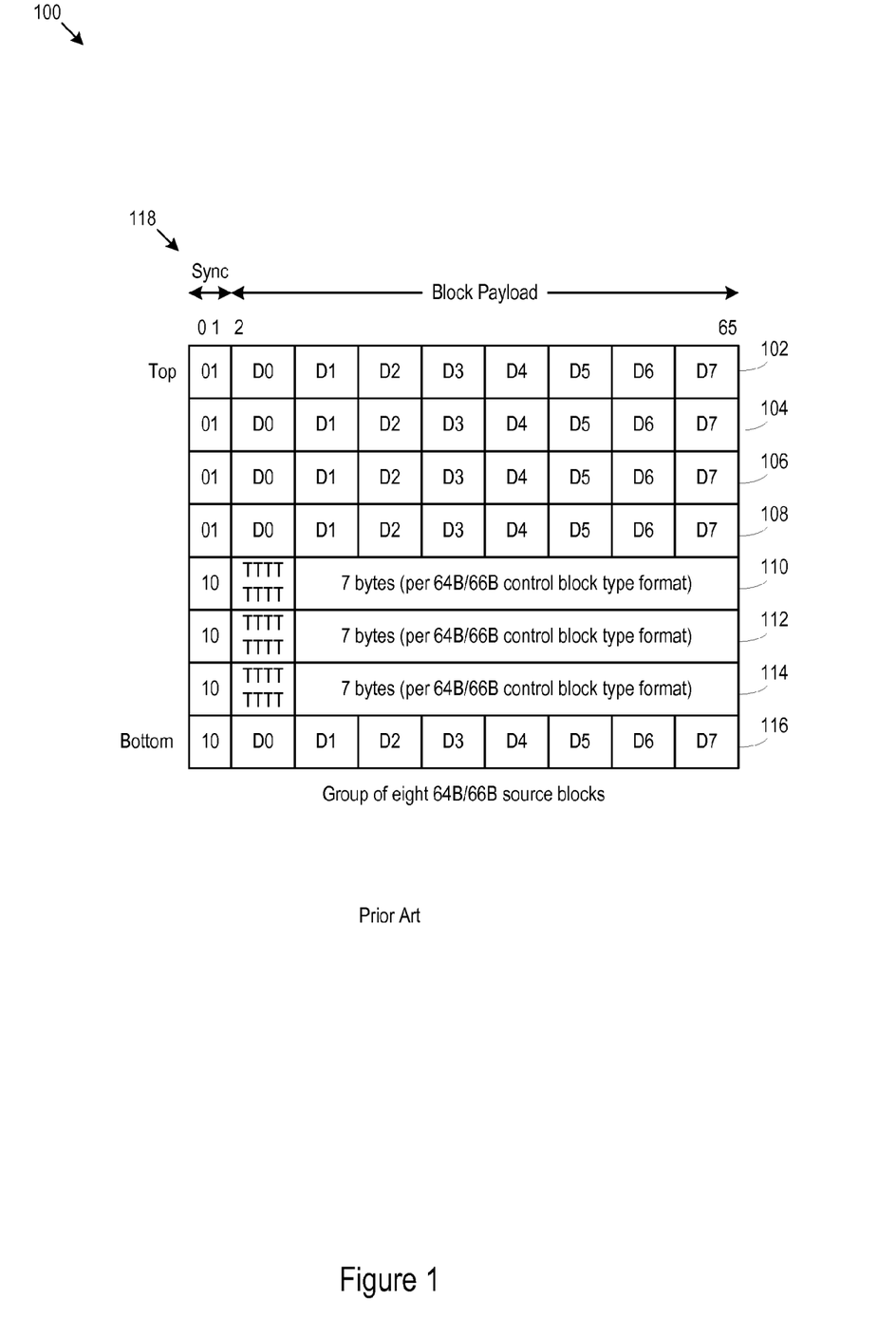
FIG. 1 shows an example combination of eight (8) 64B/66B transcoded blocks.

FIG. 1 shows an example 100 of eight (8) 64 Bit (B)/66B source blocks, labeled 102, 104, 106, 108, 110, 112, 114, and 116. Two synchronization bits 118 begin each 64B block, leading to a 66B total block size. With eight blocks there are 8*64=512 payload bits and 8*66=528 total bits in the block including the synchronization bits. The two synchronization bits 118 indicate, for each block, the block type. For example, the synchronization bits "01" may indicate a data block, and the synchronization bits "10" may indicate a control block.

Figure 2:
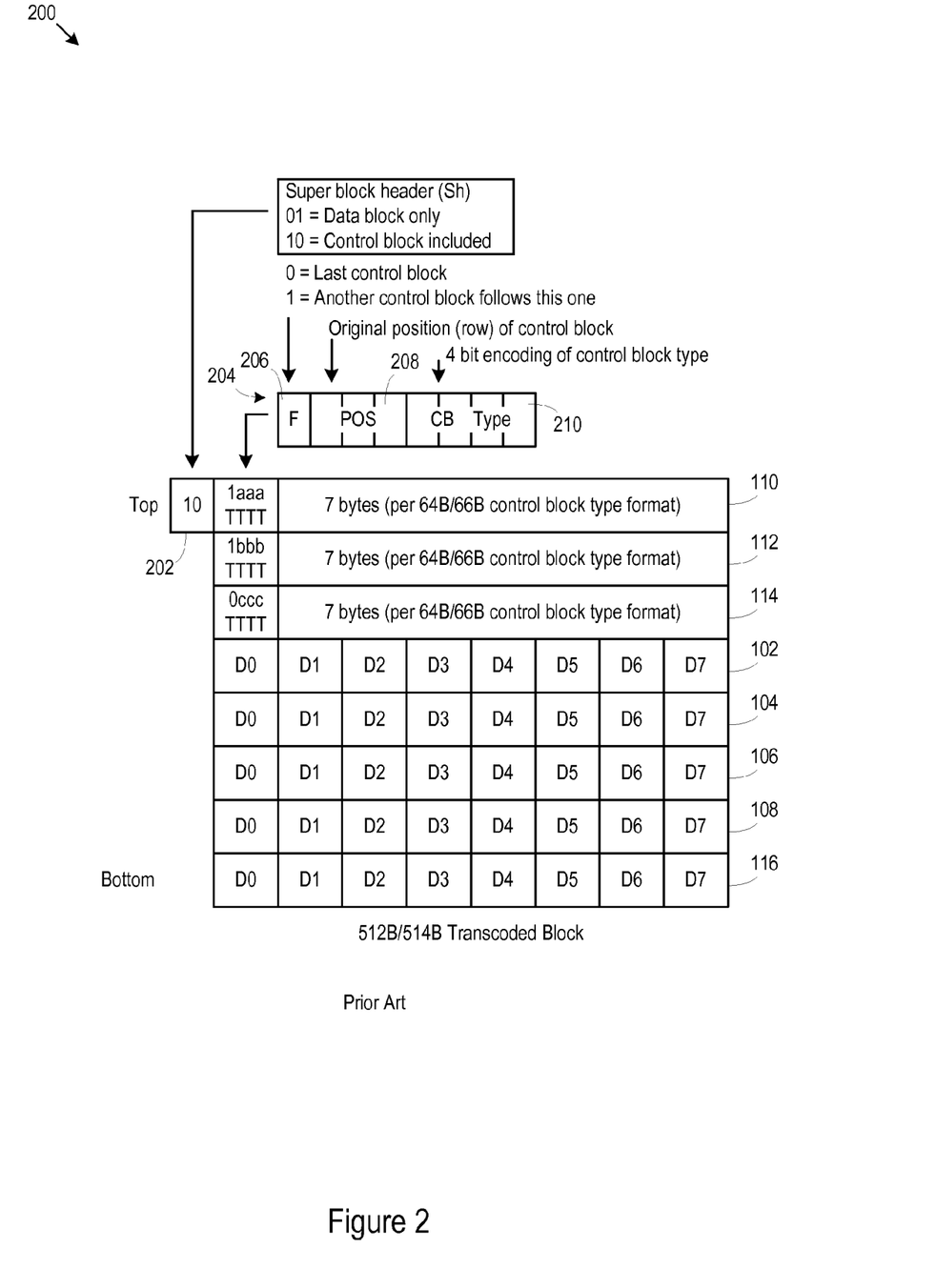
FIG. 2 shows an example of how 512B/514B transcoding works.

In the example in FIG. 1, there are three control blocks (110, 112, and 114) among the eight total blocks. Each control block has a header byte as its first byte, which are also shown, as are the seven remaining bytes in the control block. The header byte has eight information bits (shown as TTTT TTTT) in FIG. 1, which are used to provide information about the control block, such as control block type. The blocks shown in FIG. 1 may be Ethernet Physical Coding Sublayer (PCS) blocks, for example FIG. 2 shows an example 200 of how the source blocks of FIG. 1 may be transcoded so that fewer bits are used to represent the original information. A two bit superblock header (Sh) 202 starts the eight block group. A "01" in the superblock header 202 indicates that only data blocks will follow. A "10" in the superblock header 202 indicates that one or more control blocks are included and start the group. Each control block starts with the one byte header 204. The header format has been transcoded to include a control block pattern that includes a continuation field 206 (e.g., a 'last' indicator or "F" field), e.g., one bit, a 'position' field 208 (e.g., 3 bits), and a 'type' field 210 (e.g., 4 bits). The continuation field 206 indicates whether another control block follows the current one; the 'position' field 208 indicates the original position of the control block within the group of eight original blocks; and the 'type' field 210 indicates the type of the control block. Note that there are still 8*64=512 payload bits, but that only 8*64+2=514 total bits are used to represent the transcoded group, rather than the 528 bits shown in pre-transcoded group in FIG. 1.

However, in FIG. 2, the each of the full 8 byte control blocks is moved out of original order to the beginning of the group of blocks. The movement of each byte of the control block is supported by a certain amount of switching and multiplexing logic to reorder the bytes. To reorder all eight bytes of each control word between arbitrary rows in the group therefore incurs a certain logic overhead which may be significant.

The discussion below addresses a reduced complexity version of the transcoding technique shown in FIGS. 1 and 2. In particular, FIG. 3 also shows an example 300 in which the eight block group has been transcoded. The example 300 in FIG. 3 also includes a two bit superheader 314 of the type shown in FIG. 2. However, in the example show in FIG. 3, the reduced complexity transcoding leaves in place all but the one byte header for each control block. In particular, the first byte of a data block may be swapped with the one byte header of a control block. The one byte headers of the control blocks are moved to form a group of header bytes 316, with the first header byte following the superheader 314.

Figure 3:
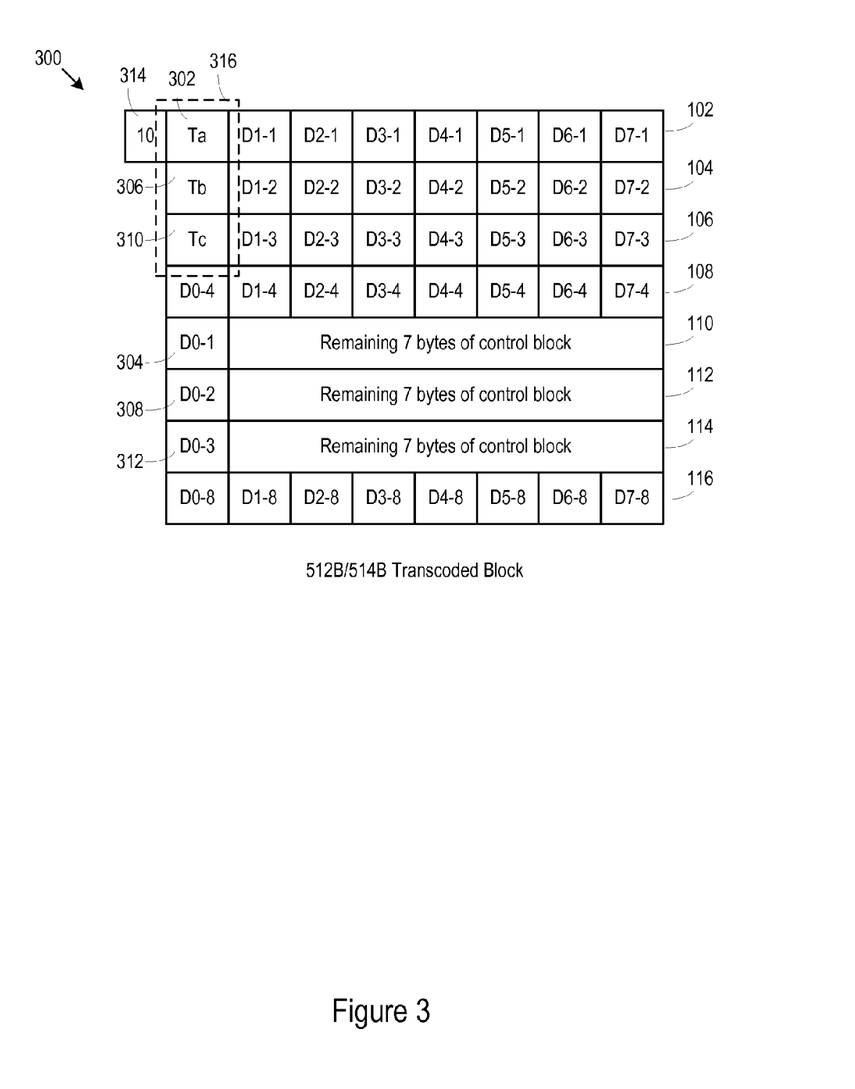
FIG. 3 shows an example of a reduced complexity transcoding technique.

In this example, the group of header bytes 316 includes one control block header byte per row for each control block in the group of eight blocks. For example, for the control block 110, bytes 1-7 remain in place, but the first byte 302 ("Ta") has been moved to the beginning of the group. The first byte 302 ("Ta") may be swapped with the first byte 304 ("D0-1") of the first data block 102. In other words, a control block byte (e.g., the first) is swapped with a byte (e.g., the first) of a non control block, such as the data block 102, for example. Similarly, the first byte 306 ("Tb") of the second control block 112 has been moved to be part of the control byte group 316, and swaps position, for example, with the first byte 308 of the second data block 104. The first byte 310 ("Tc") of the third control block 114 has been moved to be part of the control byte group 316, and swaps position, for example, with the first bytes 312 of the third data block 108. After transcoding, the data sequence is (e.g., for transmission or a subsequent processing stage): 10, Ta, D1-1, D2-1, D3-1, D4-1, D5-1, D6-1, D7-1, Tb, D1-2, . . . , D0-1, remaining seven bytes of control block 110, D0-2, remaining seven bytes of control block 112, . . . , D7-8.

The transcoded block shown in FIG. 3 also uses 514 total bits to carry 512 payload bits. However, much less movement and reorganization of data bytes is performed compared to the example in FIG. 2. In particular, only one byte in eight is moved, resulting in far less logic complexity to implement the transcoding technique described above with reference to FIG. 3. Expressed another way, the logic that performs the reduced complexity transcoding may avoid swapping data for any 64B block, other than, for example, the first byte of a 64B block.

Figure 4:
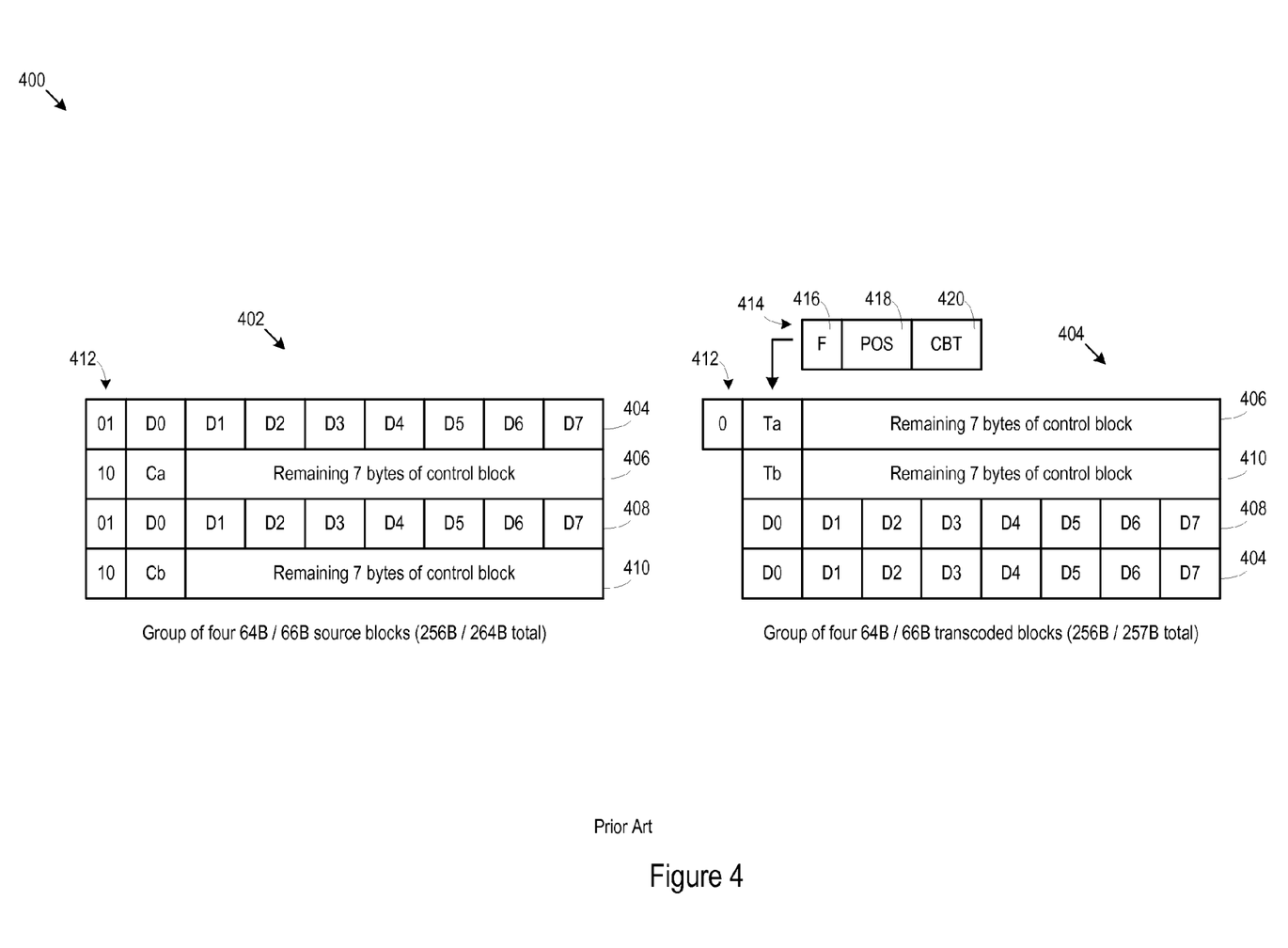
FIG. 4 shows an example of a 256B/257B transcoding structure.

Transcoding techniques apply across many different group structures. Another example of such a structure is the 256B/264B structure. FIG. 4 shows an example that does not use the reduced complexity approach. A source 4 block group 402 shows an example of the original order of the data. There is a data block 404 followed by a control block 406, followed by a data block 408 and a control block 410. As in FIG. 1, each block includes a two bit synchronization header 412. Accordingly, FIG. 4 shows a 256/264 bit block.

FIG. 4 also shows how the group 402 is transcoded to obtain the transcoded block 404. As in FIG. 2, each control block (406, 410) is moved to the start of the group. A single bit superblock header (Sh) 412 is used in this example to indicate whether the block 404 includes control blocks (Sh=0) or not (Sh=1). As with the control byte pattern 204, the transcoding generates a control byte pattern 414. The control byte pattern 414 may include a continuation field (e.g., a 'last' or "F" field) 416 (e.g., one bit), a 'position' field 418 (e.g., 2 bits), and a 'type' field 420 (e.g., 4 bits). The 'last' field 416 may indicate whether another control block follows the current one; the 'position' field 418 indicates the original position of the control block within the group of four original blocks; and the 'type' field 420 indicates the type of the control block. Note that there are still 4*64=256 payload bits, but that only 4*64+1=257 total bits are used to represent the transcoded group, rather than the 264 bits shown in pre-transcoded group in FIG. 4. Note also, however, that the transcoding technique moves entire control blocks (406, 410) to different positions, incurring the same type of complexity described above with regard to FIG. 2.

Figure 5:
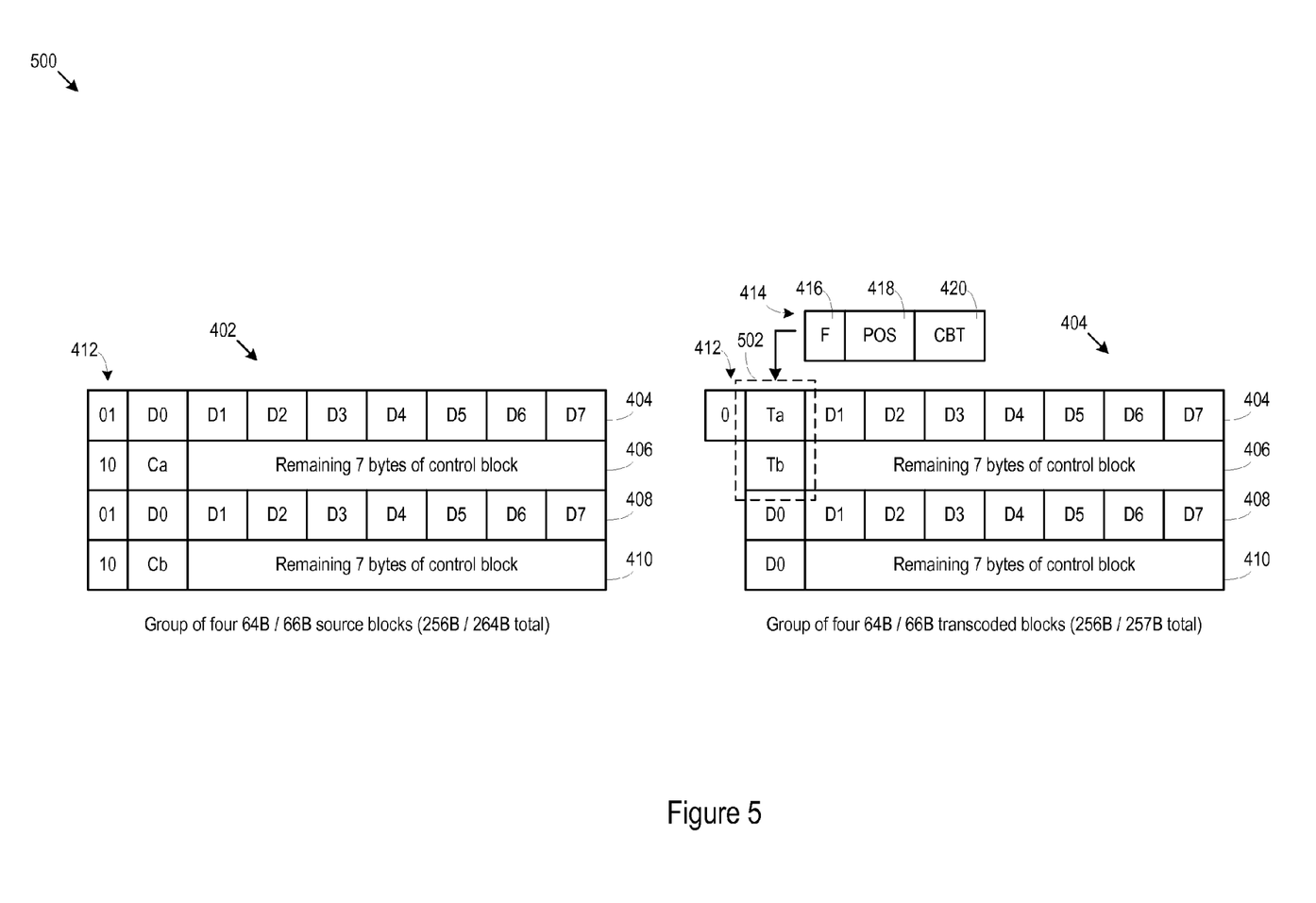
FIG. 5 shows an example of a reduced complexity 256B/257B transcoding structure.

The reduced complexity transcoding technique applies across many different transcoding structures, including the 256B/264B structure shown in FIG. 4. In FIGS. 4 and 5, "Ca" or "Cb" indicates the header byte of the corresponding control block (of which there are two in this example). The label "Ta" or "Tb" indicates the header byte of the control block "Ca" or "Cb" after transcoding for the corresponding 64B block. In the reduced complexity example 500 of FIG. 5, note that the header bytes of the control blocks (406, 410) were moved, while the remaining seven bytes of each control block (406, 410) remain in place. In particular, the header bytes were moved to form a control block header group 502. The group 502 is a first byte block-by-block sequence of header bytes and includes as the first byte in each block, the header bytes from each control block, to form a sequence of header bytes. As one possibility, the header byte Ca for the control block 406 may be transcoded into place, as Ta, as the first byte of the data block 404, and the header byte Cb for the control block 410 may be transcoded into place, as Tb, as the first byte of the data block 406. As another possibility, the header byte Cb for the control block 410 may be inserted in place of the first byte of the data block 404, and the Ca header byte may remain in place, but be transcoded to include the control bit pattern 414. Transcoding may also include adding a superheader 412 and creating the control byte pattern 414 for each header byte.

Figure 6:
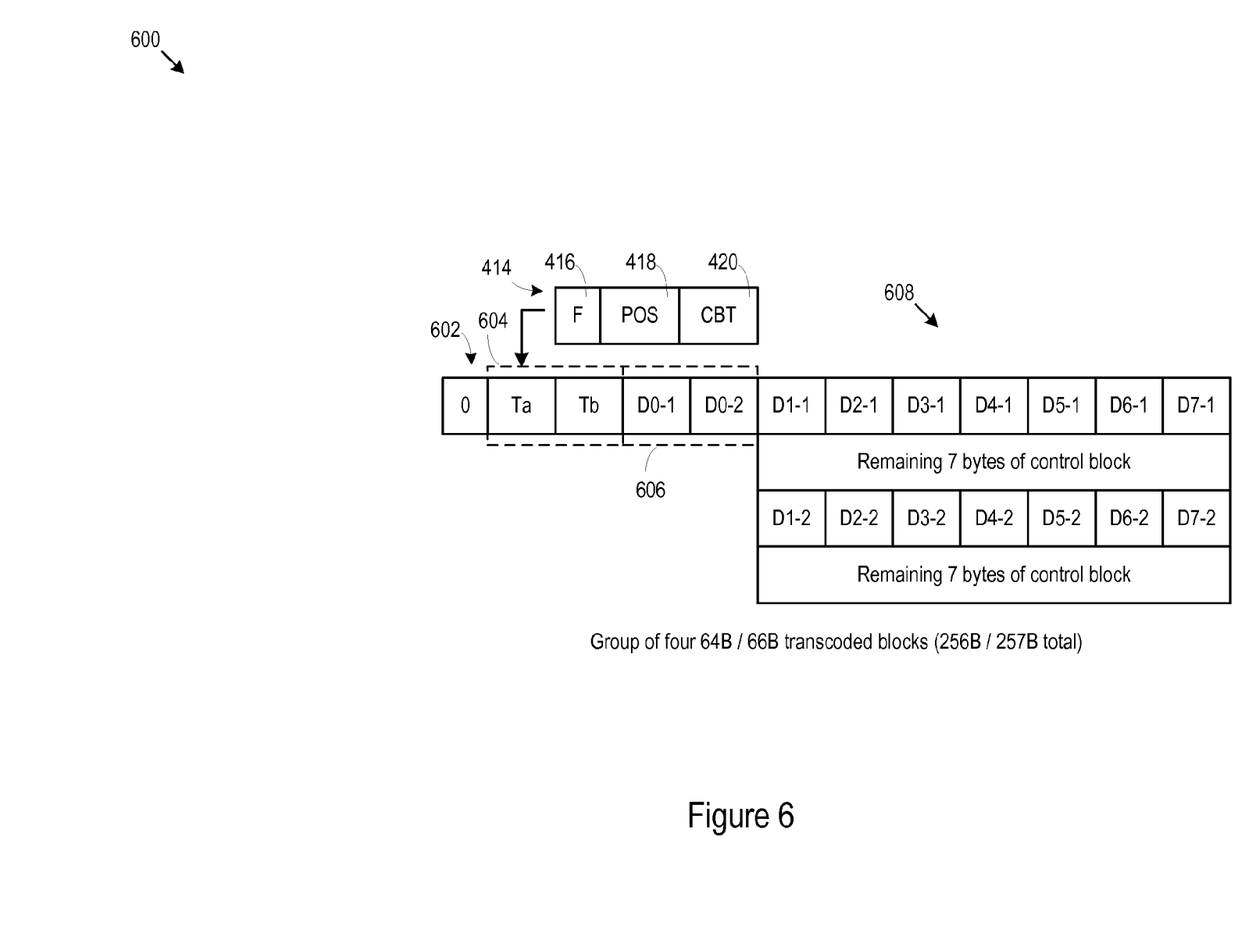
FIG. 6 shows an example of a reduced complexity 256B/257B transcoding structure.

FIG. 6 shows another example 600 of a reduced complexity 256B/257B transcoding structure. In the example 600, the transcoding technique groups together the first bytes of each 64B block and places them in sequence after (e.g., immediately after) the superheader 602. The transcoding technique thereby forms a sequential group 604 of control block header bytes, followed by a byte-by-byte sequential group of first data block bytes 606, following by the remaining data 608, in order.

At receiver side, the receiver receives the superheader 602, followed by the first four bytes in the groups 604 and 606. The superheader 602 indicates that there are control block header bytes that follow in the group. From the continuation fields in the header bytes, the receiver knows which bytes are control block header bytes and which bytes are data block bytes. From the 'position' fields in the header bytes, the receiver knows which header bytes belong to which control blocks at any given row. The receiver may then decode the block by associating the specific header bytes with the corresponding source data blocks and control blocks. The technique shown in FIG. 6 may be extended to groups of source blocks of other sizes.

The reduced complexity transcoding techniques described above may:

1) apply to any number of source blocks, such as a group of four or eight source blocks;

2) after transcoding, retain fewer (e.g., one (1)) synchronization bits instead of more bits, such as two (2) synchronization bits (e.g., as shown in FIG. 1), for each transcoding block;

3) use fewer (e.g., two (2)) bits to represent the original position of each 64B block instead of more bits, such as three (3) bits. The reduced complexity transcoding technique may allocate, for example, the third bit in the three bit position field as a parity bit or other information or control bit. For example, within the control block bit patterns, the reduced complexity transcoding technique may use a parity check of a one (1) bit flag, a two (2) bit position index, and four (4) bit control block type;

4) retain in place all but, for example, the header bytes of control blocks; and 5) greatly reduce the logic needed to reorder data in the group of blocks for transcoding, since only, for example, the header bytes of control blocks are swapped or moved to different positions in the transcoded group.

Regarding the transcoding logic, for a transcoding block with, for example, four 66B blocks, the transcoding logic may include a 4-to-1 multiplexer for each bit within the 257B or 258B (if it is 256B/258B transcoding) space. Since each 64B block has eight bytes, the reduced complexity technique can reduce the multiplexing logic complexity by about eight (8) times. Furthermore, the proposed reduced complexity transcoding technique can be applied to other transcoding formats, such as 1024B/1027B transcoding, 512B/513B transcoding, 512B/516B transcoding, 256B/258B transcoding, 128B/129B transcoding, and other formats. Note that due to its efficiency, the reduced complexity transcoding technique may also improve the processing latency compared to existing transcoding techniques.

The reduced complexity transcoding techniques may be used in conjunction with any communication standards. For example, the techniques may be used in connection with the 1024B/1027B transcoding adopted by the 40 Gigabit (40 G) Optical Transport Network (OTN) standard, or the 256B/257B transcoding adopted by the 100 G backplane standard (IEEE P802.3bj). The reduced transcoding techniques may be applied to any other past, present, or future networks.

Figure 7:
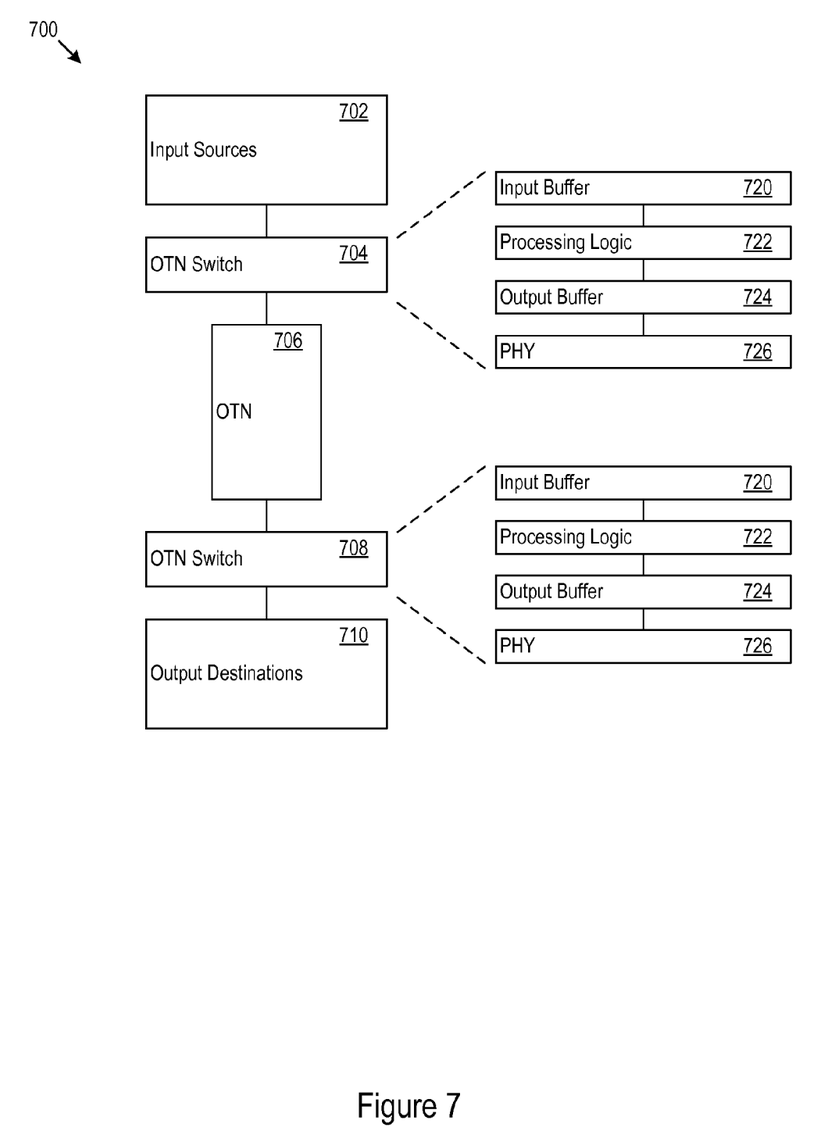
FIG. 7 shows an example of logic that transcodes information and decodes transcoded information.

FIG. 7 shows an example of logic 700 that transcodes information and decodes transcoded information. Input sources 702 provide data from any number and variety of data sources, whether audio, video, or any other data. The input sources 702 feed the OTN switch 704. The OTN switch 704 transcodes the source data and communicates it over the OTN 706, or any other network. Similarly, the OTN switch 708 receives transcoded data from the OTN 706 and decodes the transcoded data. The OTN switch 708 provides the decoded data to the output destinations 710.

The OTN switches 704 and 708 may include an input buffer 720. The input buffer 720 may store data blocks received from the input sources 702 that will be transcoded. The input buffer 720 may also store data blocks received from the OTN 706 for decoding. The processing logic 722 may include transcoding logic and decoding logic that implements any of the transcoding and decoding techniques described above. The processing logic 722 passes transcoded blocks to the output butter 724 for communication through the PHY layer 726 and onto the OTN 706. The processing logic also passes decoded blocks to the output buffer 724 for delivery through the PHY layer 726 and to the output destinations 710.

Figure 8:
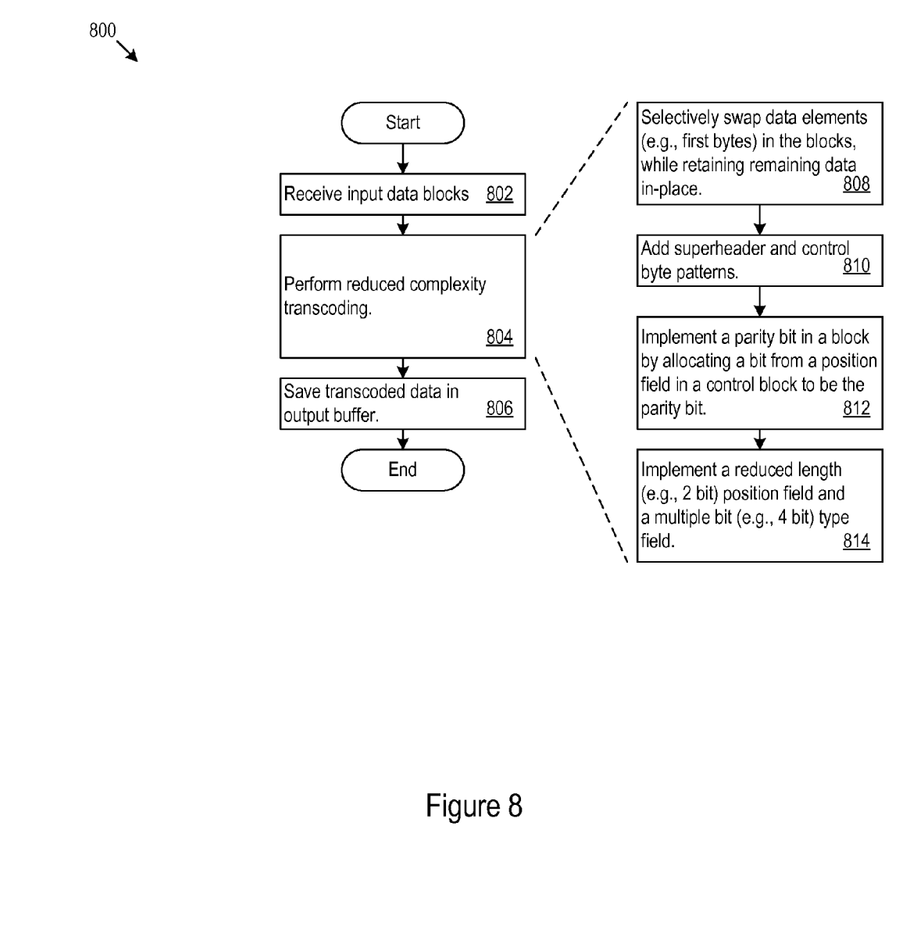
FIG. 8 shows an example of logic that transcodes information.

FIG. 8 shows an example of logic 800 that transcodes information. The logic 800 obtains input data blocks (802), for example from the input buffer 720. The logic 800 then transcodes the input data blocks (804) and saves the transcoded blocks in an output buffer (806).

The reduced complexity transcoding may include selectively swapping a data element (e.g., a first byte) in the blocks, while retaining the remaining data in the block in-place (808). In some implementations, as described with regard to FIGS. 3, 5, and 6, the transcoding technique implemented by the logic 800 does not swap data for any block in the input data except for the first byte of each block. Furthermore, the logic 800 may swap the first bytes of control blocks with other bytes in the source data to form block-by-block or byte-by-byte sequential arrangements of control block header bytes and data block bytes (e.g., as shown by elements 316, 502, 604, and 606). The logic 800 may implement the swap with multiplexers or other logic. The transcoding logic 800 may also include determining and adding a superheader (e.g., 314, 412) and control byte patterns (e.g., 414) (810).

In addition, the logic 800 may implement a parity bit in a control block header (812). For example, the logic 800 may allocate a bit from a field (e.g., the position field) in a control block to be the parity bit. The logic 800 may also implement a reduced length (e.g., 2 bit) position field and a multiple bit (e.g., 4 bit) type field (814) in a control block within any input data block. The logic 800 may employ the reduced length position field whenever the reduced length field is sufficient to indicate a desired number of position locations (e.g., 2 bits to indicate one of four locations in a 256B group of four blocks, or 3 bits to indicate one of eight locations in a 512B group of eight blocks).

Figure 9:
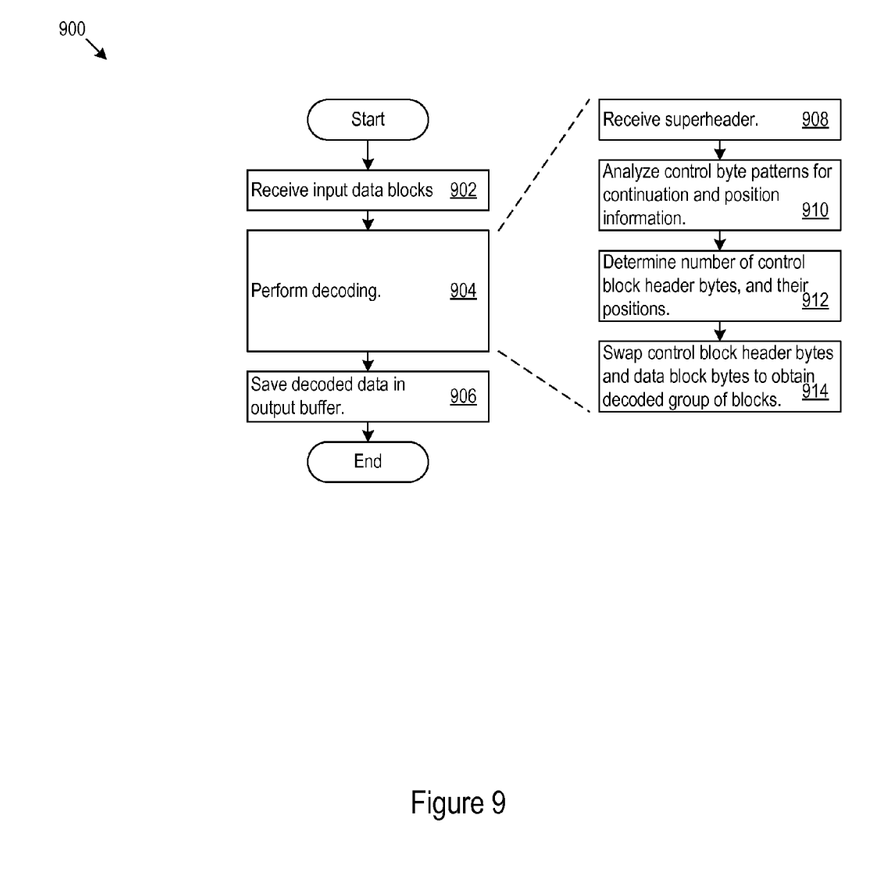
FIG. 9 shows an example of logic that decodes transcoded information.

FIG. 9 shows an example of logic 900 that decodes transcoded information. The logic 900 obtains input data blocks (902), for example from the input buffer 720. The logic 900 then decodes the input data blocks (904) and saves the decoded blocks in an output buffer (906).

The decoding may include receiving the superheader (908). If the superheader indicates that control blocks follow, then the logic 900 may receive and analyze one or more control block header bytes (910). The header bytes indicate continuation information (e.g., whether the 'last' field indicates that another header byte follows), and position information. Accordingly, the decoding logic 900 determines how many and where the control block header bytes belong in the overall group of transcoded data, and where the data block header bytes belong (912). The logic 900 then swaps control block header bytes and data block bytes to obtain decoded group of blocks (914). Note that the reduced complexity decoding does not need to swap entire control blocks with data blocks, because the transcoding process only moved a portion of the data from each block (e.g., selected first bytes) and retained, in place, the remaining portions of the control blocks and data blocks. Accordingly, the decoding logic 900 may be substantially less complex than decoding logic that would need to move entire blocks.

Figure 10:
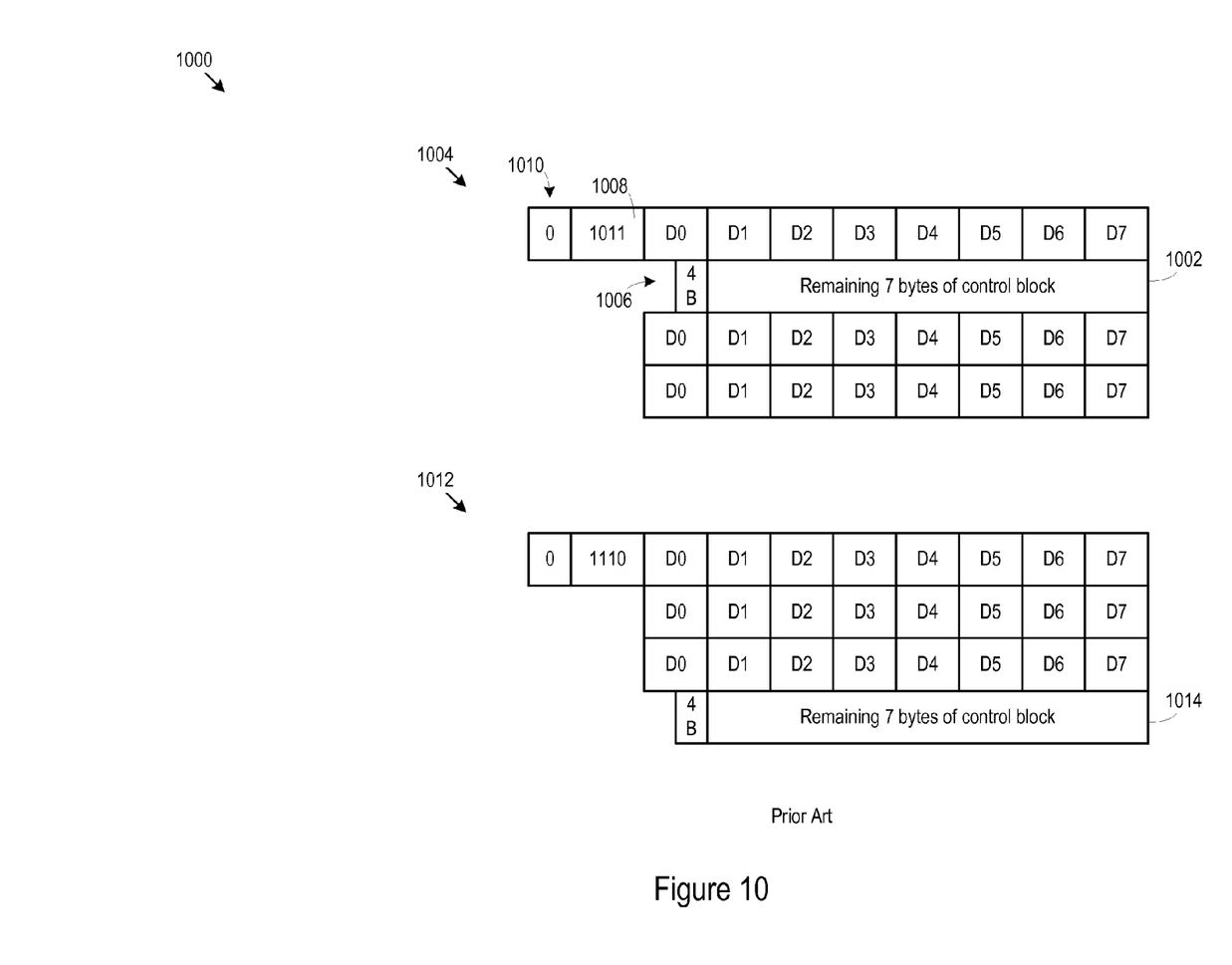
FIG. 10 shows another example of transcoding.

FIG. 10 shows another example 1000 of reduced complexity transcoding proposed by IEEE 802.3bj. If all of the blocks are data blocks, then the transcoding adds the superheader to indicate no control blocks are present, and no blocks are moved. However, when there is at least one control block (e.g., the control block 1002), in the group of blocks 1004, then the first byte of the first control block (e.g., the first byte 1006) is reduced from 8 bits to 4 bits. In addition, a four bit extended header 1008 is added with individual bits that indicate which of the blocks in the group of blocks are control blocks and which are data blocks. Control blocks may be indicated in the extended header 1008 with a '0' and data blocks may be indicated with a '1'. The superheader 1010 indicates whether the extended header 1008 is present. FIG. 10 shows a second example 1012 in which the extended header indicates that the fourth block 1014 is the control block.

Figure 11:
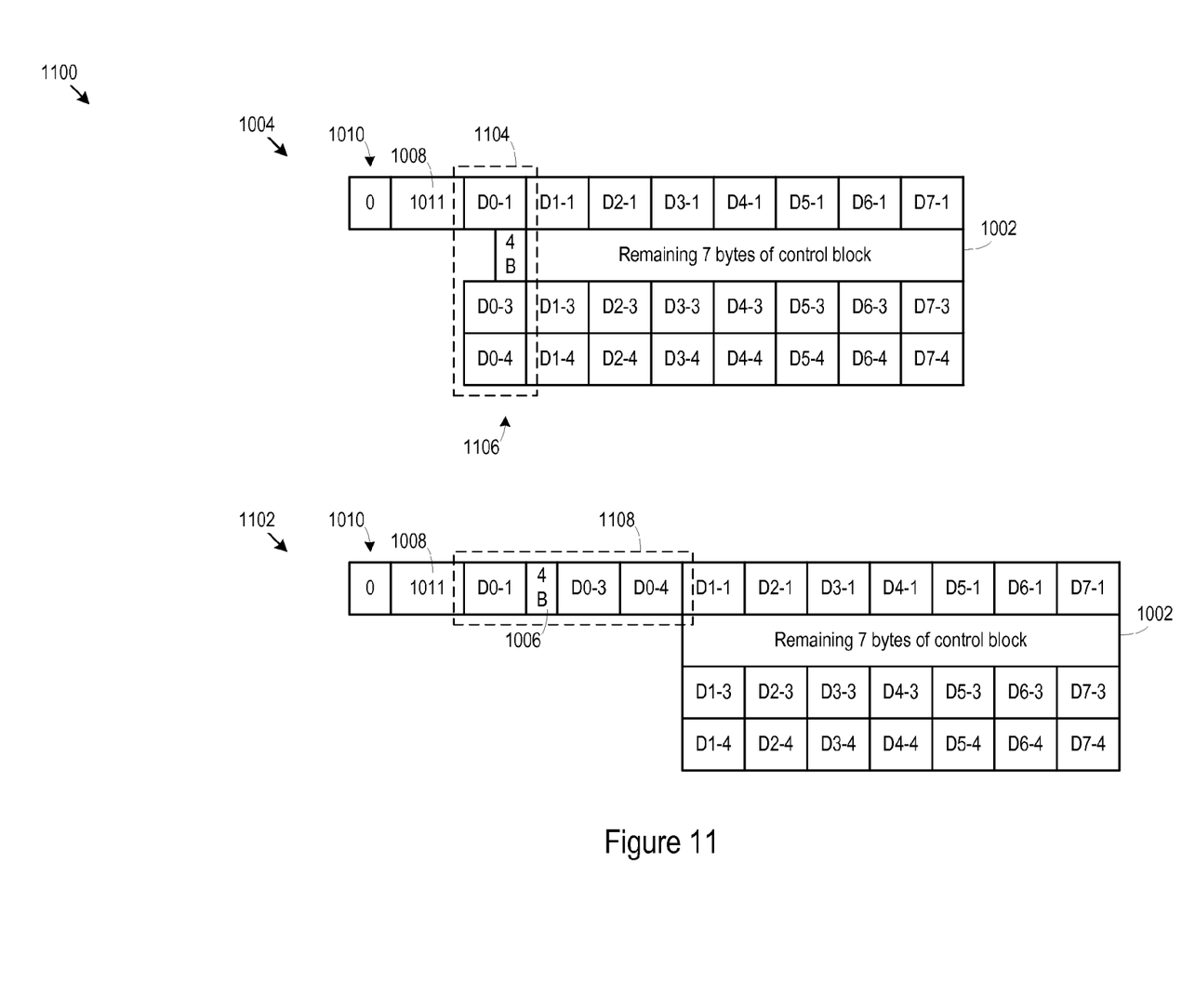
FIG. 11 shows another example of reduced complexity transcoding with respect to FIG. 10.

FIG. 11 shows an example of a low complexity transcoding improvement 1100 for the technique shown and described with regard to FIG. 10. The low complexity transcoded group of blocks 1102 results. If all of the blocks in the source group of blocks are data blocks, then the transcoding adds the superheader to indicate no control blocks are present, and no bytes are moved or swapped.

When there is at least one control block, the low complexity transcoding technique selects a group 1104 of 3 and one half bytes (28 bits) from the first column 1106. The technique moves the group 1104 to be in sequence after the first five bits that include the superheader 1010 and the extended header 1008. The sequential group 1108 results from the transcoding and follows the superheader 1010 and the extended header 1008. After transcoding, the data sequence is (e.g., for transmission or a subsequent processing stage): 0, 1011, D0-1, 4B, D0-3, D0-4, D1-1, D2-1, D3-1, D4-1, D5-1, D6-1, D7-1, remaining seven bytes of control block 1002, D1-3, . . . , D7-4.

Note that the extended header 1008 now indicates which of the following bytes are data block bytes, and which set of 4 bits is part of the control block header byte that was reduced down from 8 bits. If there are multiple control blocks, then the bits in the extended header 1008 indicate, for each control block after the first, which following bytes belong to control blocks. Again, the control block header bytes may include a control block pattern that includes position and type information. A 'last' field may or may not be included, as the extended header 1008 already indicates which bytes or nibble in the sequential group 1108 are control block bytes or nibbles.

Note that the technique shown and described with respect to FIG. 11 also significantly reduces the transcoding logic complexity. One reason is that the transcoding logic does not need to swap or move the remaining 7 bytes of each block for transcoding or decoding.

Corresponding decoder logic receives the superheader 1010 and, if present, the extended header 1008. The decoder logic determines from the extended header 1008 which of the following bytes in the sequential group 1108 are data block bytes, control block bytes, and which set of 4 bits is part of the control block header byte that was reduced from 8 bits. The decoding logic 1008 then moves the received data in the sequential group 1108 into position with their remaining bytes in each block. Thus, the majority of the data remains in place and no logic is needed to switch it or move it. The transcoders and decoder move just a portion (e.g., first bytes or nibbles) of selected blocks.

The transcoders, decoders, receivers, transmitters, methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The transcoding capability of the system may be distributed among multiple system components, such as among multiple circuits, processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A device comprising:
an input buffer operable to receive input data comprising a control block and a data block, the control block comprising multiple header bits and remaining data, the data block comprising multiple data block bits;
transcoding circuit in communication with the input buffer, the transcoding circuitry operable to obtain transcoded data by swapping the multiple header bits with the multiple data block bits while retaining in place the remaining data of the control block; and an output buffer operable to store the transcoded data.

2. The device of claim 1, where the transcoding circuitry is operable to add a control field pattern to the multiple header bits.

3. The device of claim 2, where the control field pattern comprises a position field.

4. The device of claim 2, where the control field pattern comprises a control block type field.

5. The device of claim 2, where the control field pattern comprises a continuation field.

6. The device of claim 2, where:
the control block comprises a first control block, the multiple header bits comprise a first header field of the first control block, and the remaining data comprises first remaining data of the first control block;
the input data further comprises a second control block with a second header field and second remaining data; and where transcoding circuitry is operable to: move the first header field and second header field into a first block-by-block sequence of header data in the transcoded data.

7. The device of claim 6, where the transcoding circuitry is further operable to:
retain in place the first remaining data and the second remaining data.

8. The device of claim 2, where:
the control block comprises a first control block and the multiple header bits a first header byte;
the input data further comprises a second control block with a second header byte; and where transcoding circuitry is operable to:
move the first header byte and second header byte into a byte-by-byte sequence of header bytes in the transcoded data.

9. The device of claim 8, where the transcoding circuitry is further operable to:
retain in place the first remaining data and the second remaining data.

10. The device of claim 1, where the transcoding circuitry is further configured to: obtain a selected data grouping from selected data blocks within the input data; and insert the selected data grouping into the transcoded data after the multiple header bits.

11. A device comprising:
an input buffer comprising input data in multiple data blocks;
an output buffer; and
transcoding circuitry in communication with the input buffer and the output buffer, the transcoding configured to:
identity, in the input data, a control block comprising a first group of header bits;
reduce the first group of header bits to fewer bits than were originally present in the control block;
add and extended header to transcoded data in the output buffer by swapping a second group of header bits with multiple data block bits of one of the multiple data blocks;
obtain a selected data grouping across selected data blocks in the input data, the selected data blocks comprising the selected data grouping and remaining data;
insert, into the transcoded data, the selected data grouping as a sequential group after the extended header; and
insert, into the transcoded data, the remaining data in accord with an ordering of the remaining data in the input data.

12. The device of claim 11, where the transcoding circuitry is further operable to specify in the extended header which of the data in the sequential group comprises control block data.

13. The device of claim 11, where the selected data grouping comprises a selection of data down a column in the input data across the data blocks.

14. The device of claim 13, where the column comprises a first column in the input data, and includes the first group of header bits reduced to fewer bits.

15. A method for transcoding comprising:
receiving, in an input buffer, input data comprising a control block and a data block, the control block comprising a first group of bits and a second group of bits, the data block comprising a third group of bits and a fourth group of bits;
transcoding the input data to obtain transcoded data by swapping the first group of bits with the third group of bits while retaining in place the second group of bits in the control block and while retaining in place the fourth group of bits of the data block; and saving the transcoded data in an output buffer.

16. The method of claim 15, where transcoding further comprises:
creating an initial-byte block-by-block sequence of header bytes from control blocks in the input data.

17. The method of claim 16, where:
the first group of bits comprise a first header byte of the control block;
the input data further comprises another control block with a second header byte and a third byte; and
the method further comprises moving the first header byte and second header byte into the initial-byte block-by-block sequence of header bytes.

18. The method of claim 15, where transcoding further comprises:
creating a byte-by-byte sequence of header bytes from control blocks in the input data.

19. The method of claim 18, where:
the first group of bits comprise a first header byte of the control block;
the input data further comprises another control block with a second header byte and a third byte; and
the method further comprises moving the first header byte and second header byte into the byte-by-byte sequence of header bytes.

20. The method of claim 15, further comprising: obtaining a selected data grouping from selected data blocks within the input data; and inserting the selected data grouping into the transcoded data after the third group of bits.

* * * * *